(12) United States Patent
Pupuleku

(10) Patent No.: US 11,015,580 B2
(45) Date of Patent: May 25, 2021

(54) CROSSFLOW AXES ROTARY MECHANICAL DEVICES WITH DYNAMIC INCREASED SWEPT AREA

(71) Applicant: Altin Pupuleku, Tirane (AL)

(72) Inventor: Altin Pupuleku, Tirane (AL)

(73) Assignee: Altin Pupuleku, Tirane (AL)

( * ) Notice: Subject to any disclaimer, the term of this patent is extended or adjusted under 35 U.S.C. 154(b) by 215 days.

(21) Appl. No.: 15/039,232

(22) PCT Filed: Dec. 18, 2013

(86) PCT No.: PCT/AL2013/000001
§ 371 (c)(1),
(2) Date: May 25, 2016

(87) PCT Pub. No.: WO2015/089526
PCT Pub. Date: Jun. 25, 2015

(65) Prior Publication Data
US 2016/0327022 A1    Nov. 10, 2016

(51) Int. Cl.
| | | |
|---|---|---|
| *F03D 15/10* | (2016.01) | |
| *F03B 17/06* | (2006.01) | |
| *F03D 3/06* | (2006.01) | |
| *F03D 9/25* | (2016.01) | |
| *F03B 15/00* | (2006.01) | |
| *F03D 7/06* | (2006.01) | |
| *F03D 3/02* | (2006.01) | |
| *F03D 13/20* | (2016.01) | |

(52) U.S. Cl.
CPC .............. *F03D 15/10* (2016.05); *F03B 15/00* (2013.01); *F03B 17/063* (2013.01); *F03B 17/065* (2013.01); *F03D 3/02* (2013.01); *F03D 3/061* (2013.01); *F03D 7/06* (2013.01); *F03D 9/25* (2016.05); *F03D 13/20* (2016.05); *F05B 2210/16* (2013.01); *F05B 2250/312* (2013.01); *Y02E 10/20* (2013.01); *Y02E 10/74* (2013.01)

(58) Field of Classification Search
CPC . F03D 15/10; F03D 9/25; F03D 3/061; F03D 7/06; F03D 13/20; F03D 3/005; F03D 3/02; F03D 3/064
See application file for complete search history.

(56) References Cited

U.S. PATENT DOCUMENTS 2,719,591 A * 10/1955 Schulz .................... B64C 27/08
                                                                416/115
4,065,225 A * 12/1977 Allison .................... F03D 1/025
                                                                416/121
(Continued)

*Primary Examiner* — Aaron R Eastman

(57) ABSTRACT

Crossflow axes rotary mechanical devices with dynamic increased swept area including at least two rotors attached to a support structure having their axes of rotation parallel to each other, having at least one blade attached to each rotor via a joint where the swept areas created by the blades of each rotor intersect, having at least one rotor synchronizing component so the blades from each rotor do not collide during the rotation are described. The rotors with blades share the space, the support structure, the rotor synchronizing component, the electric machines, as well as the characteristics, parameters, and effects that the crossflow axes rotary mechanical devices with dynamic increased swept area have compare to the crossflow axes rotary mechanical devices without dynamic increased swept area.

9 Claims, 12 Drawing Sheets

(56) References Cited

U.S. PATENT DOCUMENTS

| | | | | |
|---|---|---|---|---|
| 2005/0008488 A1* | 1/2005 | Brueckner | ............... | F03D 1/02 |
| | | | | 416/132 B |
| 2009/0196748 A1* | 8/2009 | Salter | ................ | F03D 1/02 |
| | | | | 416/120 |
| 2009/0220339 A1* | 9/2009 | Wu | ................ | F03D 3/0445 |
| | | | | 416/1 |
| 2011/0140452 A1* | 6/2011 | Whitworth | ............... | F03D 3/06 |
| | | | | 290/55 |
| 2013/0078092 A1* | 3/2013 | Chen | ................ | F03D 7/0252 |
| | | | | 416/1 |
| 2014/0133965 A1* | 5/2014 | Ginsburg | ........... | F28D 21/0001 |
| | | | | 415/122.1 |
| 2014/0364265 A1* | 12/2014 | Bentgen | ............... | B63H 23/06 |
| | | | | 475/151 |
| 2015/0003982 A1* | 1/2015 | Radovich | ................ | F03D 7/06 |
| | | | | 416/1 |
| 2016/0160650 A1* | 6/2016 | Kullander | ............ | F03B 13/183 |
| | | | | 416/176 |

\* cited by examiner

CROSSFLOW AXES ROTARY MECHANICAL DEVICES WITH DYNAMIC INCREASED SWEPT AREA

FIELD OF THE INVENTION

The invention relates to the class of crossflow axes rotary mechanical devices, which may provide the basis for a new class of crossflow axes rotary mechanical devices with Dynamic Increased Swept Area, suitable for different fluid types and a range of applications such as wind turbines, hydro turbines, propellers, fan-blowers, pump-compressors, mixers etc.

BACKGROUND OF THE INVENTION

The crossflow axes rotary mechanical devices include different types of devices such as wind turbines, hydro turbines, propellers, fan-blowers, pump-compressors, mixers etc. These devices share common characteristics, effects, parameters and mechanisms such as rotors with arms and blades, support structures, electric machines (electric generators or electric motors) along with the parameters defining the devices and their mechanical and physical behaviors, but above all they share the main characteristic which is the orientation of their axes of rotation being always perpendicular to the flow.

The crossflow axes turbines represent the main crossflow axes rotary mechanical devices and have a long history of designs (the drag type disclosed in the U.S. Pat. No. 1,766,765, the lift type disclosed in the U.S. Pat. No. 1,835,018).

Main advantage of crossflow axes turbines is being omni directional (compare to the flow axes turbines, the crossflow axes turbines do not need to be pointed into the flow direction).

Main disadvantage of crossflow axes turbines is being less efficient than the flow axes turbines, mainly because of the limited swept area used by the devices to create positive torque (to extract energy). FIG. 1a is a schematic display of a crossflow axes lift turbine 10, rotor 11, the swept area 24 and the limited swept area "Lift Area" used by the turbine to create positive torque, while FIG. 1b is a schematic display of a crossflow axes drag turbine 10, rotor 11, the swept area 24 and the limited swept area "Energy Extraction Area" used by the turbine to create positive torque (from the free fluid flow point of view, the amount of the fluid being "processed" by the crossflow axes turbines is less than the amount of the fluid being "processed" by the flow axes turbines, space wise).

Other disadvantages of the crossflow axes turbines are the pulsation of the blades for each revolution passing through different pressure parts (especially for the lift type crossflow axes turbines that have stress forces on the blades vary from compressional to tensional for each revolution), bending moment created on the rotor shaft (especially for large structures), the negative effects that the turbulent wakes created by the blades of lift type turbine have on the blades that passes them, the transmission of the fluctuating loads to the support structure (as well as to the other systems such as the foundation system, shaft system, generator system, bearings etc), self starting problem (the lift type turbines), lack of fluid dynamic braking (aerodynamic braking or hydrodynamic braking), unsmooth torque curve and vibrations.

The present invention seeks to provide a new class of crossflow axes rotary mechanical devices, which may become more efficient than the current class of crossflow axes rotary mechanical devices and may overcome some of the disadvantages listed above.

SUMMARY OF THE INVENTION (From here on DI SA means Dynamic Increased Swept Area, CARM means Crossflow Axes Rotary Mechanical, Y—Device Yawing Angle, TSR—Tip Speed Ratio, S—Solidity of the blade turbine, RN—Reynolds Number, BL—Blade Boundary Layer, VT—Vortex Type, BT—Blade Type (shape. foil), FT—Fluid Type (air, water), BN—Blade Numbers, β—Blade Pitch Angle (foil blades), Ro—Rotors Offset, δBR—the space between each blade's tip and the opposite rotor's plane, δB—the minimum space between two crossing close passing blades from opposite rotors, BSR—Blade Spacing per Rotor, BSBR—Blade Spacing Between Rotors).

The CARM devices with DISA create a new class (a super class) compare to the conventional CARM devices class, because they include (inherit) all the characteristics, effects, parameters and mechanisms of the conventional CARM devices plus new ones such as:

New characteristics—the main new characteristic the CARM devices with DISA have compare to the conventional CARM devices (without DISA), is the increased swept area (especially the energy extracting/exerting part of the swept area) in a dynamic way, comparing to the conventional CARM devices that may increase their swept area statically by static ducting, helical blades etc. The increase of the "energy extracting/exerting" part of the swept area means more fluid being "processed" by the CARM devices with DISA (space and material wise), or less fluid escaping "unprocessed" from these devices (from this point of view the Dynamic Increased Swept Area concept is equivalent to the Dynamic Increased Processed Fluid concept). The CARM devices with DISA may change the size of their swept area (or the amount of fluid being processed) depending on different factors, such as the device relative position to the flow direction, counter or co rotating rotors, blade pitch angle etc.

Another characteristic of the CARM devices with DISA is the modularity. The base of the CARM devices with DISA is a module of at least two rotors sharing their spaces, the fluid, the support structure, the rotors synchronizing mechanisms, the electric machines, the braking systems, the yawing systems, as well as the characteristics, parameters, and effects. The CARM devices with DISA can have a plurality (array) of modules, where they can share among them the support structure, the electric machines as well as the torque, the fluctuating loads etc.

New effects—the CARM devices with DISA experience new effects compare to the conventional CARM devices (without DISA), such as:

Dynamic Ducting—it is created by the blades of opposite rotors rotating relative to each other, decreasing the "escaping" or "unprocessed" fluid from the device, increasing the "processed" fluid by the device space and material wise (it effects both lift and drag devices)

Dynamic Flow Deflection—it is created by the blades of opposite rotors rotating relative to each other, changing in turn the direction of the fluid by "entrapping" it, increasing the "processed" fluid by the device and the speed of it, space and material wise (it effects both lift and drag devices)

Dynamic Fluid Shield—it is created by the blades of opposite rotors rotating relative to each other, where for the lift type devices each blade of one rotor forms a fluid "shield" to the blades of the opposite rotor decreasing the negative drag forces, while for the drag type devices the blades rotating against the fluid direction reduce their shape thus decreasing the negative drag forces (it effects both lift and drag devices)

Dynamic Fluid Braking—it is created by positioning the new CARM devices with DISA relative to the flow direction, thus changing the size of the "energy extracting/exerting" part of the swept area, or the amount of the fluid processed by the device (it effects both lift and drag devices)

Dynamic Wake Cancel—it is created by the lift type blades of the opposite rotors counter rotating relative to each other, producing counter rotating wakes that may cancel each other in the process, thus decreasing the wake effect to the blades on the down flow part (it effects the lift devices)

Dynamic Change of Blade Angle of Attack (by Dynamic Flow Deflection)—it is created by the foil (lift) blades of opposite rotors rotating relative to each other, maintaining an optimal blade angle of attack for the lift forces during the rotation, as well as delaying the deep stalling and the wake creation process (it effects the lift devices)

These effects depend on different factors such as the type of the devices (lift, drag), relative position of the devices to the flow direction, rotors offset Ro, counter rotating or co rotating rotors, blade numbers, blade pitch angle, blade spacing between Rotors $B_{SBR}$ etc (different combination of the factors mentioned above may favor some effects and disfavor the others).

New parameters—the CARM devices with DISA have new parameters compare to the conventional CARM devices (without DISA), such as:

$\delta_{BR}$—the space between each blade's tip and the opposite rotor-arm plane $\delta_B$—the minimum space between two close passing blades from opposite rotors Ro—Rotors Offset, which is the distance between two offset parallel rotors axes Y—Yaw angle, which determines the position of the devices "energy extracting/exerting" part of the swept area relative to the flow direction $B_{SBR}$—Blade Spacing Between Rotors $0°<=B_{SBR}<180°$, which is the angle between the two close blades from opposite rotors on a plane parallel to the rotors, where one of the blades is at the $\varphi=0°$ rotating phase angle $B_{RA}$—Blade Rotation Angle $0°<B_{RA}<90°$, which is the maximum angle of the rotating blade (drag type) relative to its rotor on the rotor-arm plane Additional mechanisms—the CARM devices with DISA have additional mechanisms compare to the conventional CARM devices (without DISA), such as:

rotor synchronizing component—a component that synchronizes the rotors rotation relative to each other with the same TSR, avoiding the blades of the opposite rotors collision during the rotation, serving as shaft mechanism (lift and drag devices)

blade-rotor synchronizing mechanism—a mechanism that synchronizes the rotation of the blade relative to its rotor along with the rotors synchronizing mechanism in such way that the blades of the opposing rotors do not collide during the rotation (drag devices)

blades synchronizing mechanism—a mechanism that synchronizes the blades rotation (for the same rotor) during the rotors rotation, and is linked to the blade-rotor synchronizing mechanism in such way that the blades of the opposing rotors do not collide during the rotation (drag devices)

yaw mechanism—a mechanism that orients the new devices "energy extracting/exerting" part of the swept area relative to the flow direction for a maximum "energy extracting/exerting" value (lift and drag devices)

The CARM devices with DISA of the new class (supper class) tent to become conventional CARM devices without DISA (conventional class) when the CARM devices with DISA are dismounted or half mounted (in this case the CARM devices with DISA loses completely the new characteristics, new parameters, new effects and the additional mechanisms, becoming conventional CARM devices without DISA), or when the CARM devices with DISA change their position relative to the flow direction (in this case the CARM devices with DISA decrease the "energy extracting/exerting" part of swept area, decreasing their gains from the new characteristics, new parameters, new effects and the additional mechanisms, tenting to become conventional CARM devices without DISA).

A CARM device with DISA include at its base at least two rotors with equal radial arm sizes (meaning two rotors with equal radius size where each rotor's radius is the arm) attached to a support structure, where the rotors with arms are parallel to each other and have parallel axes of rotation on a plane perpendicular to the fluid (the rotors axes of rotation may be vertical, horizontal or have any angle on the plane that is always perpendicular to the fluid). The rotors rotate (counter rotate or co rotate in the case of lift devices) relative to each other in synchrony with the same TSR by at least one rotor synchronizing component. The rotors can be coaxial or non coaxial with a rotors offset $0<=Ro<2R$, where R is the rotor radius or the radial arm size (for the value of Ro=0 the rotors are coaxial). The CARM device with DISA further includes at least one blade attached to each rotor via the radial arm on the side between the rotors (the device may have different number of blades varying on different factors, such as the type of CARM device, fluid type, fluid speed etc). There is a space between each blade's tip and the opposite rotor's plane $\delta BR>=RFR$, where RFR is the Rotors Freedom of Rotation (meaning that the blades of one rotor do not collide with the opposite rotor during the rotation), and a minimum space between two blades from opposite rotors close passing each other during the rotation $\delta B>=BNCS$, where BNCS is the Blades Non Collision Space (meaning that the blades of the opposite rotors do not collide during the rotation) There is a Blade Spacing Between Rotors $0°<=B_{SBR}<180°$, which is the angle between two close blades from opposite rotors on a plane parallel to the rotor-am plane, where one of the blades is at the 0° rotating phase angle. A CARM device with DISA further includes at least one electric machine, which might be an electric generator (turbines), or an electric motor (propellers, fan-blowers, pump-compressors, mixers etc). A CARM device with DISA has one support structure of different types, where the whole device is mounted. A CARM device with DISA may extract (exert) energy from gases, liquids or both of them. The two opposite rotors of a CARM device with DISA with blades attached via arms share a common space, fluid and other systems like the support structure system, the synchronizing mechanism, the electric machine (generator/motor), the braking system, the yawing system etc, forming one device module.

The synchronization of relative rotating rotors of a CARM device with DISA at the same TSR (avoiding the collision of the opposite rotors blades during the rotation) can be realized by at least one rotor synchronizing component. The rotor synchronizing component can be mechanical, including one shaft connected to both rotors parallel to the rotors axes of rotation and gearing mechanism to keep the rotors synchronized at the same TSR (the shaft transmits the torque of one rotor to the electric machine connected to the other rotor), or can be electrical including one electric motor/generator per each rotor, an algorithm, and a system that links the electric motor/generator by wire or wireless (in this case the synchronizing electromechanical system behaves like an electromagnetic gearing system, while the algorithm programme can synchronize counter (co) rotating rotors, as well as their speed according to the maximum efficiency curve for different fluid speeds, with the right chosen parameters).

A CARM device with DISA may include blades on the side not between the rotors as well, where the angle between two closest blades of each rotor on the rotor-arm plane is $0° <= B_{SR} <= 180°$. In this case there is a hybrid of a CARM device with DISA operating on the side between the rotors, and a conventional CARM device operating on the side not between the rotors.

A CARM device with DISA may have an array of modules, where the angle between two closest blades of each rotor on the rotor-arm plane may be $0° <= B_{SR} <= 180°$. The modules may have blades with the same height (one module of rotors have always the same blades height and this is defined by the $\delta_{BR}$), or different modules may have blades with different heights. The array of modules may have one electric machine or different ones along the array of modules (in this case each electric machine may have a dual role as a generator/motor and a synchronizer).

The CARM devices with DISA that have an electric machine as an electric generator for extracting energy from the fluid, creates a subclass of crossflow axes turbines with DISA.

A crossflow axes turbine with DISA may have different braking systems such as mechanical braking, electromagnetic braking, fluid dynamic braking or the combination of them (the fluid dynamic braking is a new characteristic of the new devices with DISA, and this may be realized by changing the device position relative to the flow, by changing the blade pitch angle for lift type turbines or combination of them).

A crossflow axes turbine with DISA is not "fully" omni directional, but instead a "semi" omni directional device (meaning that the new device would always work on any position relative to the flow direction, but its performance would be different for different positions of the device relative to the flow direction). The position of the new device relative to the flow direction may be defined by the yaw angle Y. The yaw system of a crossflow axes turbine with DISA may include a passive yaw system (vane system), an active yaw system with electric motors, or a combination of them.

The crossflow axes turbines with DISA where the blades profiles is a foil create a new subclass of crossflow axes lift turbines with DISA. In this case the rotors are non coaxial and the rotors offset Ro is a function of Ro=f($\delta_B$, Y, TSR, S, $R_N$, $B_L$, $V_T$, $B_T$, $F_T$, $B_N$, $\beta$, $B_{SR}$, $B_{SBR}$).

A crossflow axes lift turbine with DISA may have rotors counter rotating or co rotating in synchrony by the rotor synchronizing component.

A crossflow axes lift turbine with DISA may have fixed blade pitch angle, where the pitch angle may be a function of $\beta$=f(Y, Ro, TSR, S, $R_N$, $B_L$, $V_T$, $B_T$, $F_T$, $B_N$, $B_{SR}$, $B_{SBR}$). The fixed pitch angle may be the same for all the blades, or may be different for different blades of the same rotor or different rotors, and this depends on $\beta$ function parameters (especially the $B_{SR}$ and $B_{SBR}$ parameters).

A crossflow axes lift turbine with DISA may have variable blade pitch angle, where the variable pitch angle may be a function of $\beta$=f(Y, Ro, TSR, S, $R_N$, $B_L$, $V_T$, $B_T$, $F_T$, $B_N$, $B_{SR}$, $B_{SBR}$). The variable pitch angle does not change per one revolution, but it is more a reset of the pitch angle adjusted to the flow speed and direction changes (in the case of flow direction changes, the variable pitch angle may be adjusted to combine with different yaw systems).

A crossflow axes lift turbine with DISA may have different blades geometry per rotor or between rotors, such as straight, curved (semi helical blade), swept (semi delta blade) or a combination of them. The new turbine may have different blade foils per rotor or between rotors, as well as symmetric or asymmetric foil (the blades with asymmetric foil may have an advantage compare to symmetric one, because it can extract all the energy on the up flow part where there is less fluid flowing through new devices, so there is no need for a symmetric foil getting lift on the down flow part, as a result the stress forces on the blades would not vary from compressional to tensional for each revolution).

A crossflow axes lift turbine with DISA may include a plurality of struts, mechanically coupling the blade to its arm.

The crossflow axes turbines with DISA having curved vanes (drag type blades) and counter rotating rotors create a subclass of crossflow axes drag turbines with DISA, where the rotors can be co axial or non coaxial.

A crossflow axes drag turbine with DISA of type 1 includes at least two coaxial rotors rotating relative to each other in synchrony by a rotor synchronizing mechanism. It includes at least two opposite symmetric base blades fixedly attached to each rotor via the radial arm, overlapping each other in the centre of the rotor, where each base blade has an angle to its rotor plane on the rotors axes side <=90°.

It further includes one base blade extension on the outer side of each base blade of one rotor having an angle to its rotor plane on the rotors axes side <900, and one base blade extension on the inner side of each base blade of the other rotor having an angle to its rotor plane on the rotors axes side <900. In addition, the shape of each blade extension is configured to create a maximum dynamic fluid ducting and dynamic fluid deflection with the opposite rotor blade extensions close passing each other at their intersecting section during the rotation, having a minimum space between them $\delta B$.

A crossflow axes drag turbine with DISA of type 2 includes at least two non coaxial rotors rotating relative to each other in synchrony by a rotor synchronizing mechanism, and at least two opposite symmetric blades fixedly attached to each rotor where the closest distance of each blade to the rotor centre is greater than the half of the respective rotor's arm.

A crossflow axes drag turbine with DISA of type 3 includes at least two coaxial rotors rotating relative to each other in synchrony by a rotor synchronizing mechanism, at least two opposite symmetric blades per rotor attached to the respective rotating axis perpendicular to the rotor-arm plane on the radial arm where the blades rotate relative to their rotor with a maximum $B_{RA}$ angle <=90°, and the distance of the blade rotating axis from the rotor centre is greater than the half of rotor's radial arm. It further includes at least one curved rail blade-rotor relative rotation mechanism per rotor fixedly attached to the support structure parallel to the rotor-arm plane on the side not between the rotors at the lower flow side, where the curved rail rotates each blade with a maximum $B_{RA}$ angle from its radial arm. It further includes a wheel at the outer lower edge of each blade with an axis of rotation perpendicular to the rotor-arm plane contacting the inner curved rail during the rotation at the lower flow side, one step on the rotor arm for each blade to stop the blade rotating relative to its rotor and one curved blades synchronizing mechanism for the blades of the same rotor.

A crossflow axes drag turbine with DISA of type 3 that have non coaxial rotors form a crossflow axes drag turbine with DISA of type 4 (in this case the blades may rotate partially around the axis which is perpendicular to the rotors plane).

A crossflow axes drag turbine with DISA of type 5 includes at least two coaxial rotors rotating relative to each other in synchrony by a rotor synchronizing mechanism, at least two opposite symmetric blades per rotor fixedly attached to a diameter arm with an angle $B_{RA}$<=90° between them where the arm is attached to the rotor to rotate relative to it around its own axis with a maximum $B_{RA}$ angle, at least one curved rail blade-rotor relative rotation mechanisms per rotor fixedly attached to the support structure on the side not between the rotors at the lower flow side, where the curved rail lays on a cylinder with a radius greater than the rotors radius perpendicular to the rotor-arm plane and the curved rail rotates each blade with a maximum $B_{RA}$ angle, including a wheel at the outer edge of each blade opposite to its rotor with an axis of rotation parallel to the rotor-arm plane, where the wheels of the blades of one rotor contact the inner side of the curved rail while the wheels of the blades of the opposite rotor contact the outer side of the curved rail during the rotation at the lower flow side and one step on the rotor plane for each diameter arm to stop the arm with blade rotating relative to its rotor where the $B_{RA}$ angle is maximum.

A crossflow axes drag turbine with DISA of type 3, type 4 or type 5 may have both the blade-rotor relative rotation mechanisms of a module of two rotors rotating around the rotor axes of rotation according to the flow direction. In this case, the rotating of the blade-rotor relative rotation mechanisms behaves like a yawing mechanism.

A crossflow axes drag turbine with DISA of type 1, type 2, or type 5 that have one module of two rotors, may have an end disk for each rotor to increase the static ducting (for the array of modules there is no need of such end disks).

The crossflow axes drag turbine with DISA of type 1, type 2, type 3, type 4 or type 5 may include different static ducting systems connected to the support structure.

The CARM devices with DISA that inherit all the characteristics of any of the devices mentioned above, having an electric machine as an electric motor for exerting energy to the fluid create different type of CARM devices with DISA, such as crossflow axes propeller with DISA, crossflow axes fan-blower with DISA, crossflow axes pump-compressor with DISA, and crossflow axes mixer with DISA.

DETAILED DESCRIPTION OF PREFERRED EMBODIMENTS

Figure 1A:
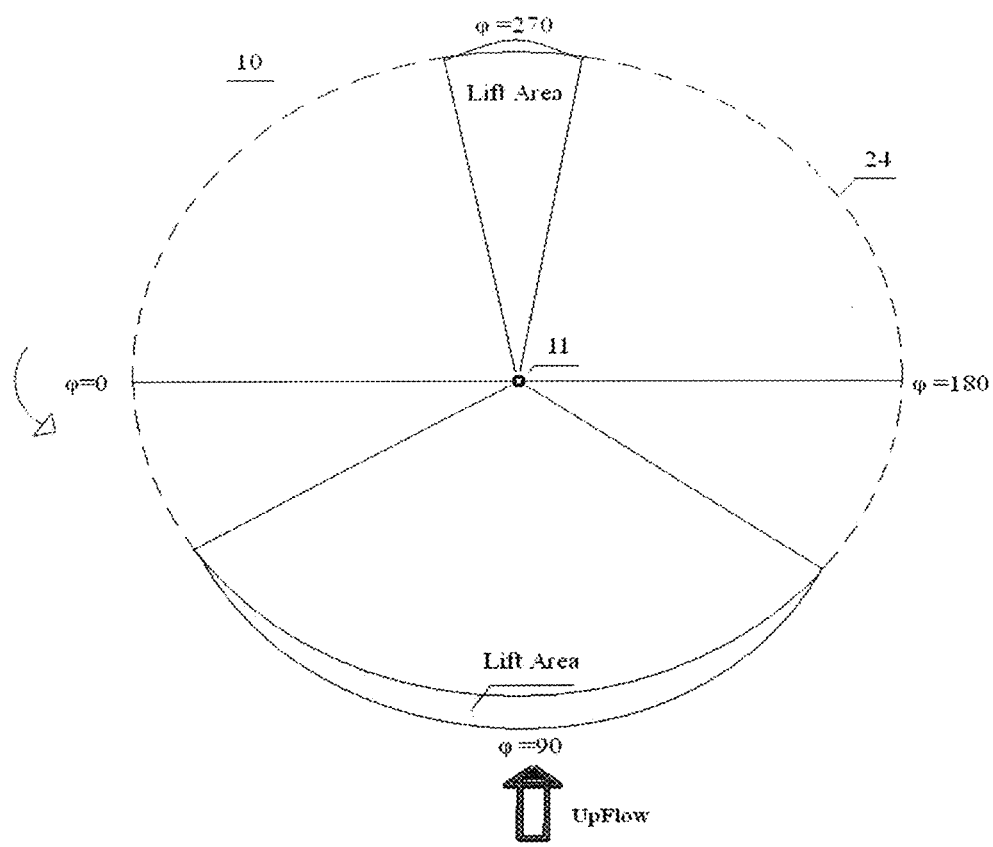
FIG. 1a is a schematic display of the swept area of a conventional crossflow axes lift type turbine (prior art).
Figure 2A:
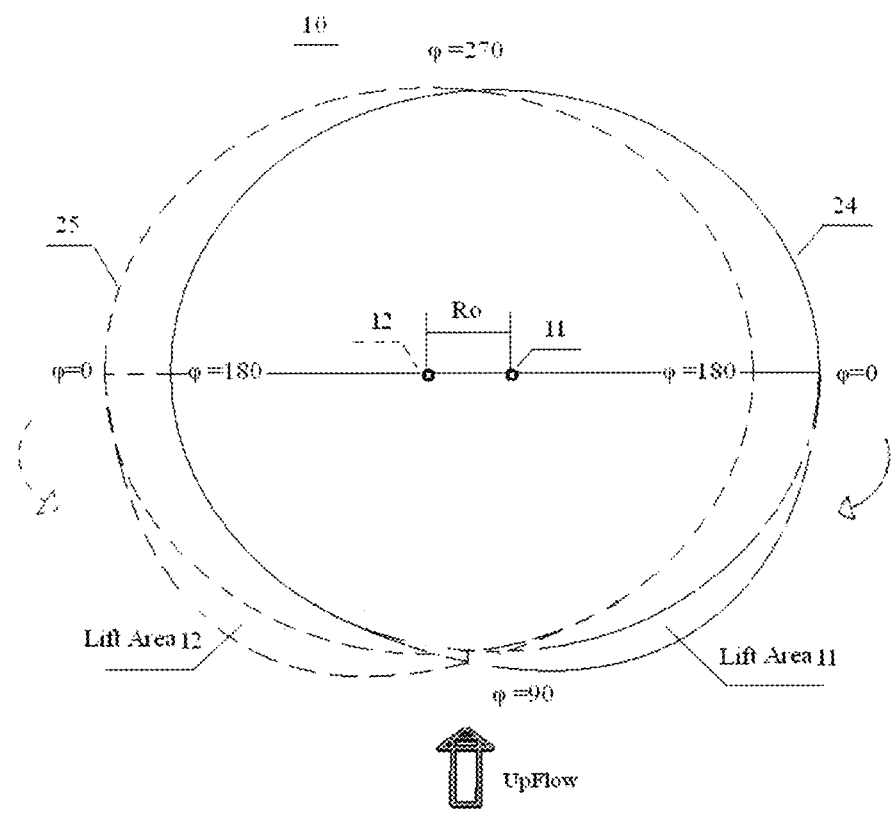
FIG. 2a is a schematic display of the swept area of a crossflow axes lift turbine with DISA, where the rotors counter rotates relative to each other.

FIG. 2a is a schematic display of a crossflow axes lift turbine with DISA 10 showing counter rotating Rotor 11 and 12 with a rotors offset Ro, the general swept area of each rotor 24 and 25 creating an increased of general swept area of the turbine (space wise) compare to the swept area of a conventional crossflow lift turbine (FIG. 1a), the energy extracting Lift Area 11 and Lift Area 12 created by respective Rotor 11 and 12. The lift part of the swept area for each rotor starts close to φ=0 (the blades have a negative pitch angle), where the lift swept areas of the opposite rotors are distanced from each other, creating favorable condition for dynamic effects such as Dynamic Ducting, Dynamic Flow Deflection and Dynamic Change of Blade Angle of Attack.

Figure 1B:
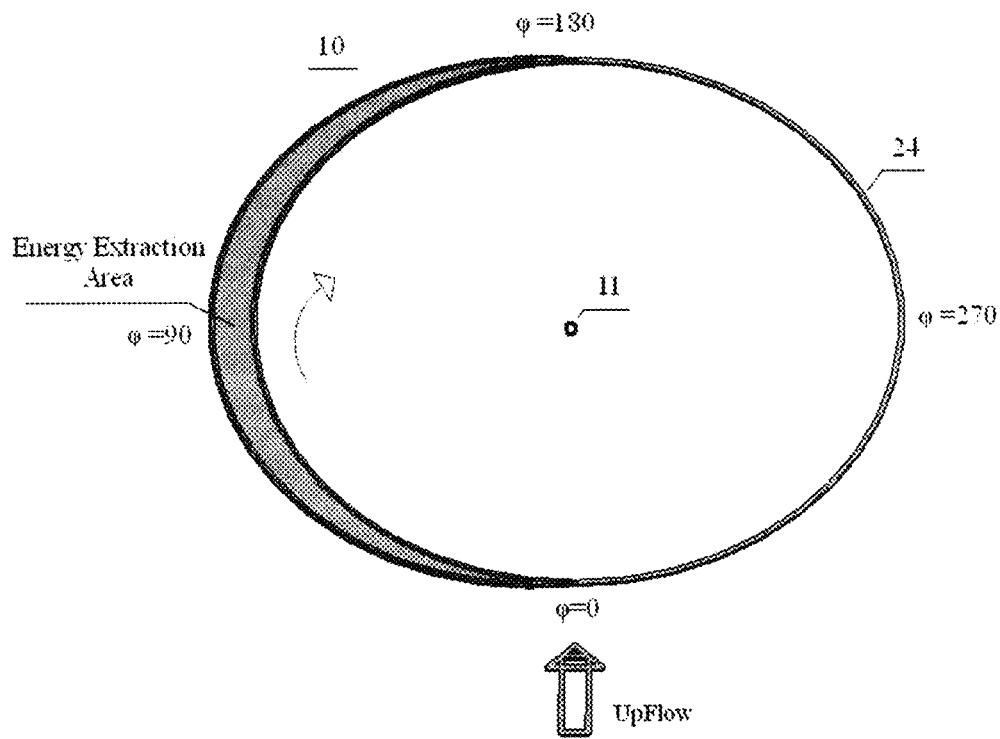
FIG. 1b is a schematic display of the swept area of a conventional crossflow drag type turbine (prior art).
Figure 2B:
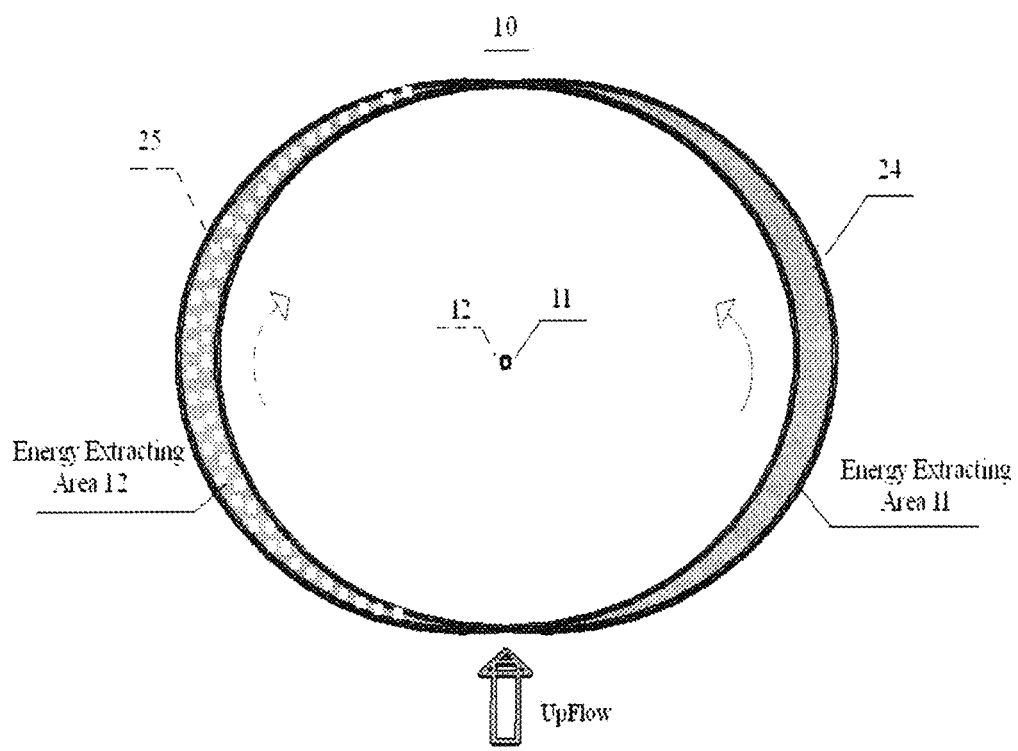
FIG. 2b is a schematic display of the crossflow drag turbine swept area.

FIG. 2b is a schematic display of a crossflow axes drag turbine with DISA 10, showing counter rotating Rotors 11 and 12 with a rotors offset Ro, the swept areas 24 and 25, the Energy Extracting Area 11 and 12 created by respective Rotor 11 and 12 on both sides of the device (compare to the Energy Extracting Area of conventional crossflow drag turbine FIG. 1b).

Figure 3A:
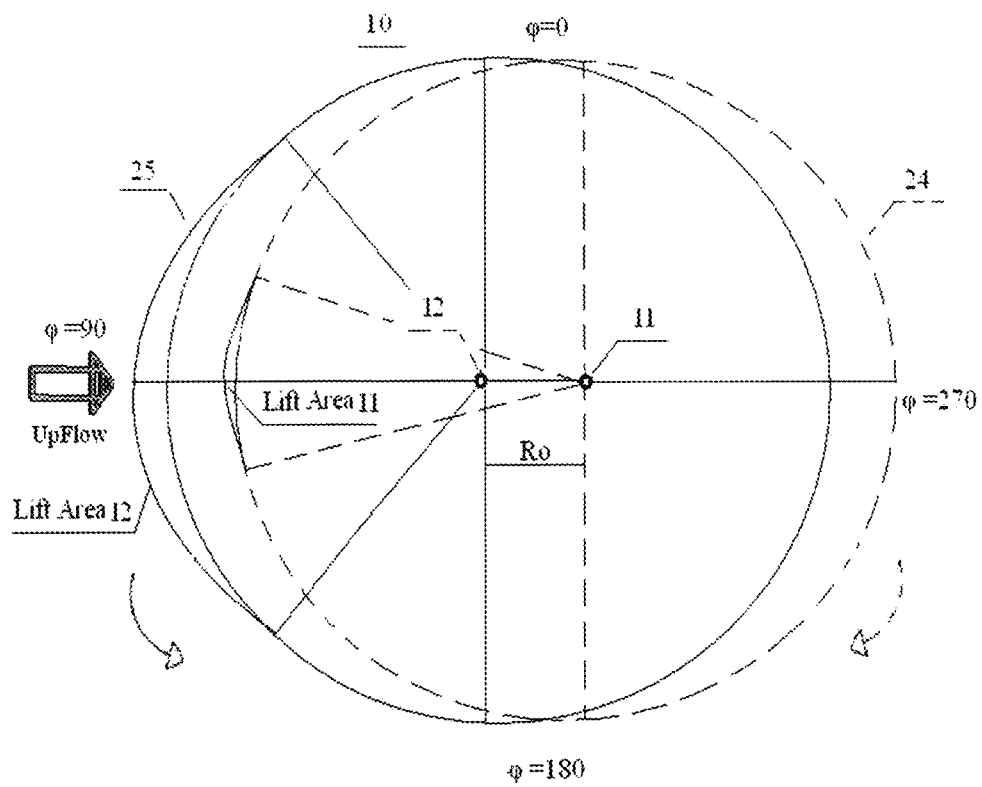
FIG. 3a is a schematic display of the size changes (decrease) of the energy extracting (lift) zone of a crossflow axes lift turbine with DISA.

FIG. 3a is a schematic display of a crossflow axes lift turbine with DISA 10, showing counter rotating Rotors 11 and 12 with a rotors offset Ro, the energy extracting area Lift Area 11 and 12 created by respective rotors 11 and 12. In this case the Lift Area 11 is decreased because of the change of the flow direction relative to the device compare to FIG. 2a, and this can be used as a device dynamic fluid braking.

Figure 3B:
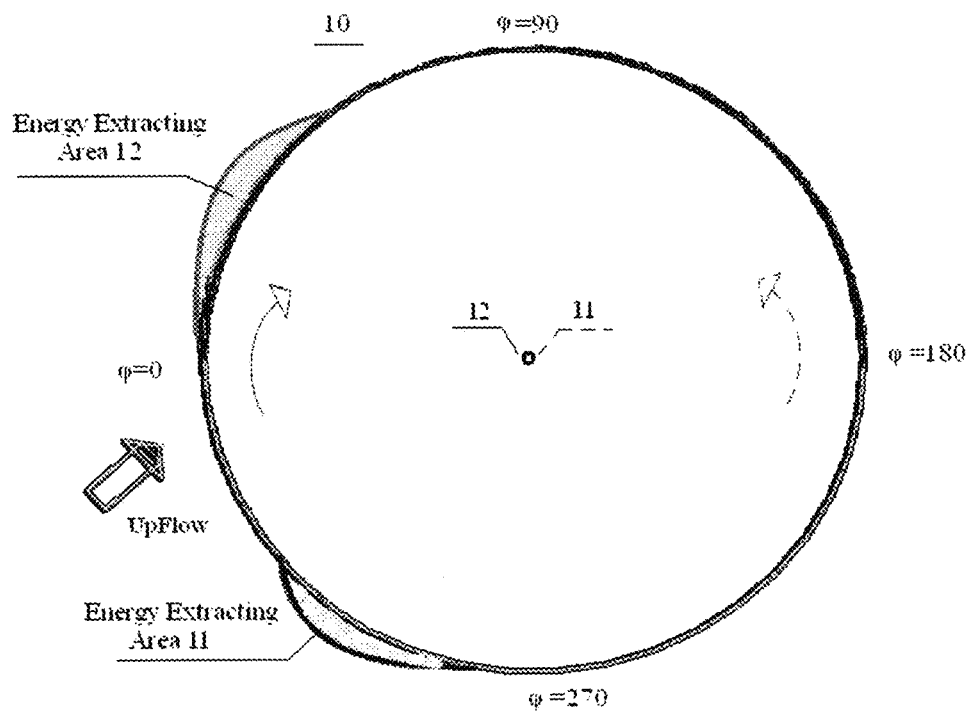
FIG. 3b is a schematic display of the size changes (decrease) of the energy extracting zone of a crossflow axes drag turbine with DISA compare.

FIG. 3b is schematic displays of a crossflow axes drag turbine with DISA 10, showing counter rotating Rotors 11 and 12 with a rotors offset Ro, the Energy Extracting Area 11 and 12 created by respective Rotor 11 and 12. In this case both the Energy Extracting Areas are decreased because of the change of the flow direction relative to the device compare to FIG. 2b.

Figure 4A:
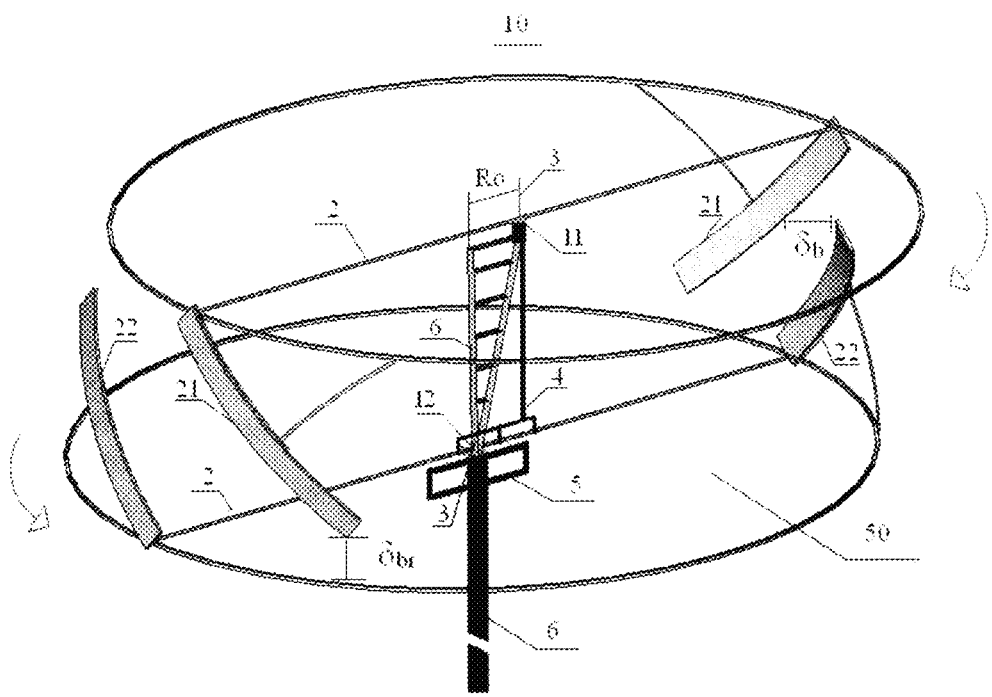
FIG. 4a is the axonometric view of a crossflow axes lift turbine with DISA.

FIG. 4a shows a crossflow axes lift turbine with DISA 10, Rotor 11 and Rotor 12 with radial arms 2 of equal sizes attached to a support structure 6 parallel to each other, having their respective axes of rotation 3 on a plane perpendicular to the fluid (it can be different angles of rotors axes of rotation 3 on a plane perpendicular to the fluid) with a rotors offset Ro>0. There are two blades 21 attached to Rotor 11 and two blades 22 attached to Rotor 12 via radial arms 2 on the side 50 between the two rotors, a space δBR>=RFR between each blade's tip and the opposite rotor's plane and a minimum space δB>=BNCS between two close blades from opposite rotors close passing each other during the rotation. The rotors counter rotate relative to each other in synchrony at the same TSR by at least one rotor synchronizing component 4, forming one module of two rotors. There is one electric machine 5 (in this case an electric generator) connected to the rotors, and there is a support structure 6 supporting the rotors with arms, blades, rotor synchronizing component and the electric generator.

Figure 4B:
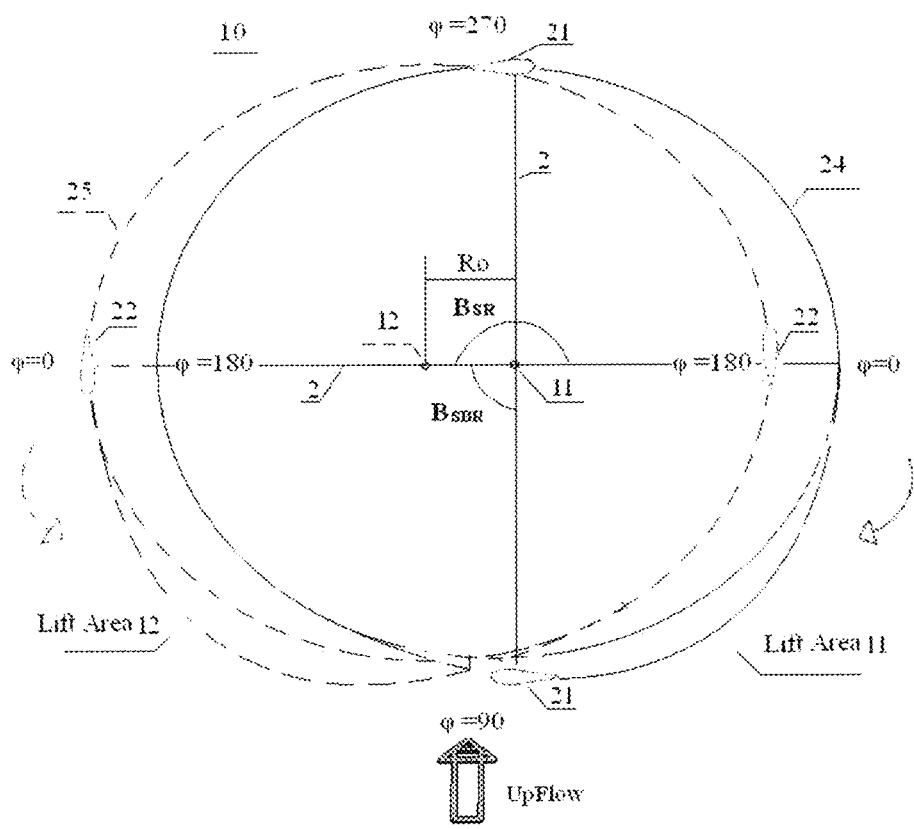
FIG. 4b is a schematic display of a crossflow axes lift turbine with DISA.

FIG. 4b is a schematic display of a crossflow axes lift turbine with DISA 10 having one module of two counter rotating rotors 11 and 12 with rotors offset Ro, two blades 21 attached to Rotor 11 via arms 2 and two blades 22 attached to Rotor 12 via arms 2, the blades spacing per each rotor $B_{SR}$ of blades 22 of Rotor 12, the blades spacing between rotors $B_{SBR}$ (90° in this case), blade 21 of Rotor 11 and blade 22 of Rotor 12 where the blade 22 is at the φ=0° rotating phase angle.

Figure 5A:
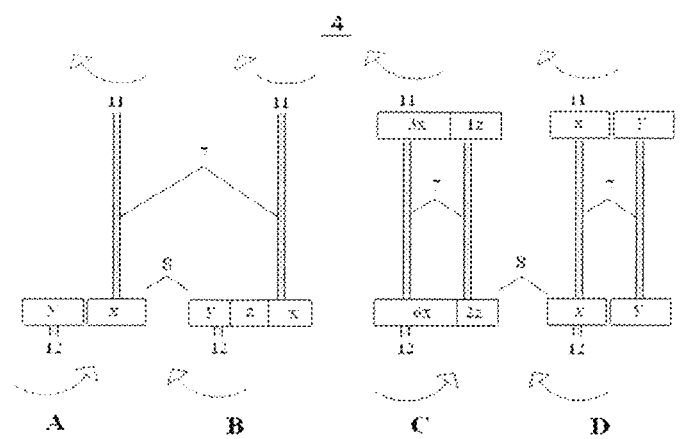
FIG. 5a is a schematic display of the drive shaft rotor synchronizing component for a CARM device with DISA.
Figure 5B:
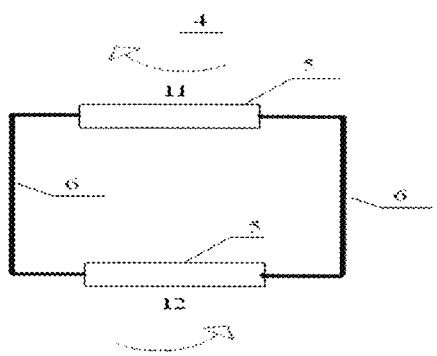
FIG. 5b is a schematic display of the electric rotor synchronizing component for a CARM device with DISA.

FIG. 5a shows the mechanical rotor synchronizing component 4 for CARM devices with DISA, composed by the shaft 7 and the gearing mechanism 8 to keep the rotors rotation synchronized at the same TSR. Gearing mechanisms 8 may have different variations, such as:
A. offset rotor counter rotating, having x:y gears (x=y for the same TSR)
B. offset rotor co rotating, having x:z:y gears (z serves for co rotating rotors)
C. coaxial rotors counter rotating, having 3x: 1z/2z:6x gears
D. coaxial rotors co rotating, having x:y/y:x gears FIG. 5b shows the electrical rotor synchronizing component 4 for CARM devices with DISA, composed by one electric motor/generator 5 per each rotor, an algorithm and a system that links the electric motor/generator by wire or wireless (in this case the synchronizing electromechanical system it may behave like an electromagnetic gearing system to keep the rotors synchronized).

Figure 6:
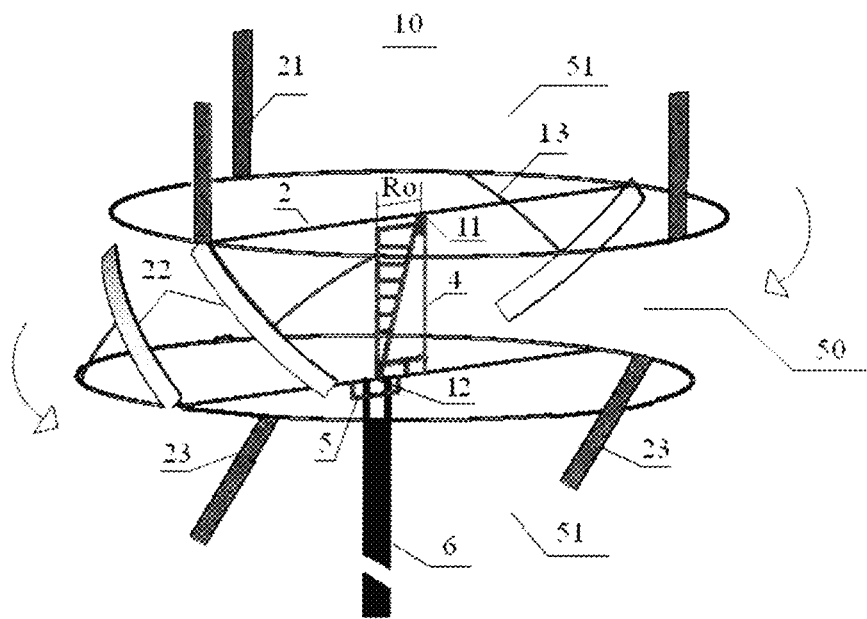
FIG. 6 is the axonometric views of crossflow axes lift turbines with DISA having different blades number, spacing and geometry per each rotor.

FIG. 6 shows a crossflow axes lift turbine with DISA 10 having one module of two counter rotating rotors 11 and 12 with a rotors offset Ro, synchronizing mechanism 4, generator 5, support structure 6, including blades on the side 51 not between the rotors. This embodiment has a hybrid of crossflow axes lift turbine with DISA operating on the side 50 between the rotors, and a conventional crossflow axes turbine operating on the side 51 not between the rotors. This embodiment has different numbers of blades per each rotor (on the side between and not between the rotors), and different blades spacing $B_{SR}$ per each rotor. It shows the straight blade 21, curved blade 22 and swept blade 23, including blade struts 13.

Figure 7A:
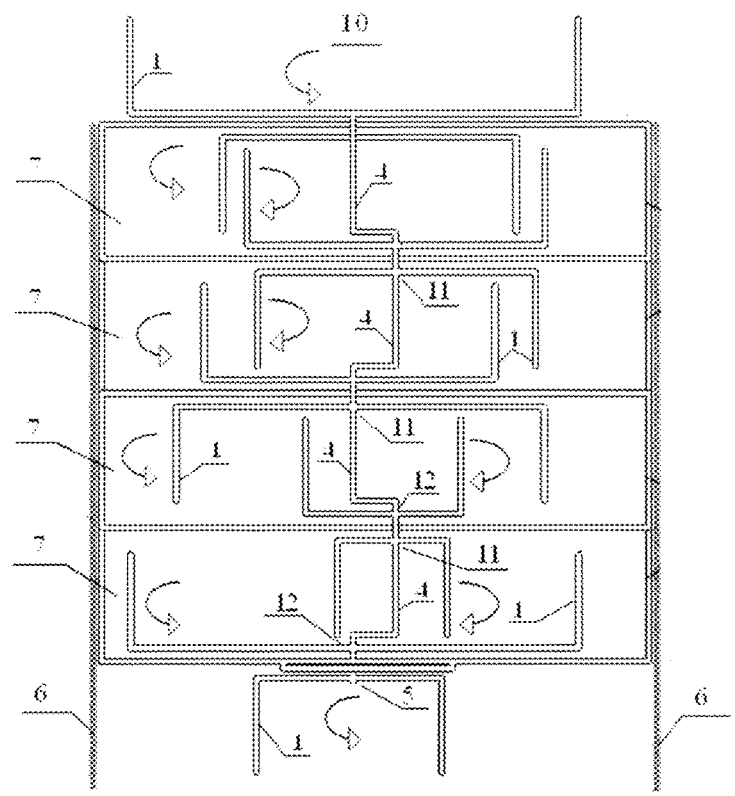
FIG. 7a is the front view of a crossflow axes lift turbine with DISA having an array of two rotor modules with the same blades height.

FIG. 7a shows a crossflow axes lift turbine with DISA 10 having an array of modules 7 (rotor 11 and 12 per module counter rotating with a rotors offset Ro), blades 1 with the same height attached to the rotors via arms, one rotor synchronizing component 4 per module, one shared electric generator 5 and support structure 6. This embodiment has different blades spacing $B_{SR}$ per each rotor on each side of it (this can smooth the torque curve, and share the loads on different modules).

Figure 7B:
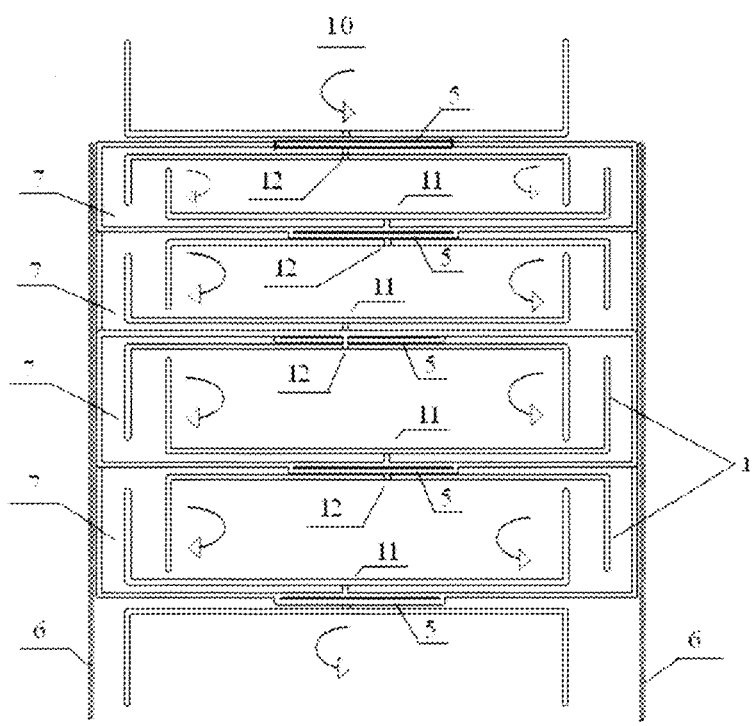
FIG. 7b is the front view of a crossflow axes lift turbine with DISA having an array of two rotor modules with different blades height per different modules, having different electric machine along the array of modules.

FIG. 7b shows a crossflow axes lift turbine with DISA 10 having an array of modules 7 (rotor 11 and 12 per module counter rotating with a rotors offset Ro) with different blades height per different modules attached to the rotors via arms, having different electric machine 5 along the array of modules (in this case each electric machine may have a dual role as a generator/motor and rotors synchronizer) and support structure 6.

Figure 8A:
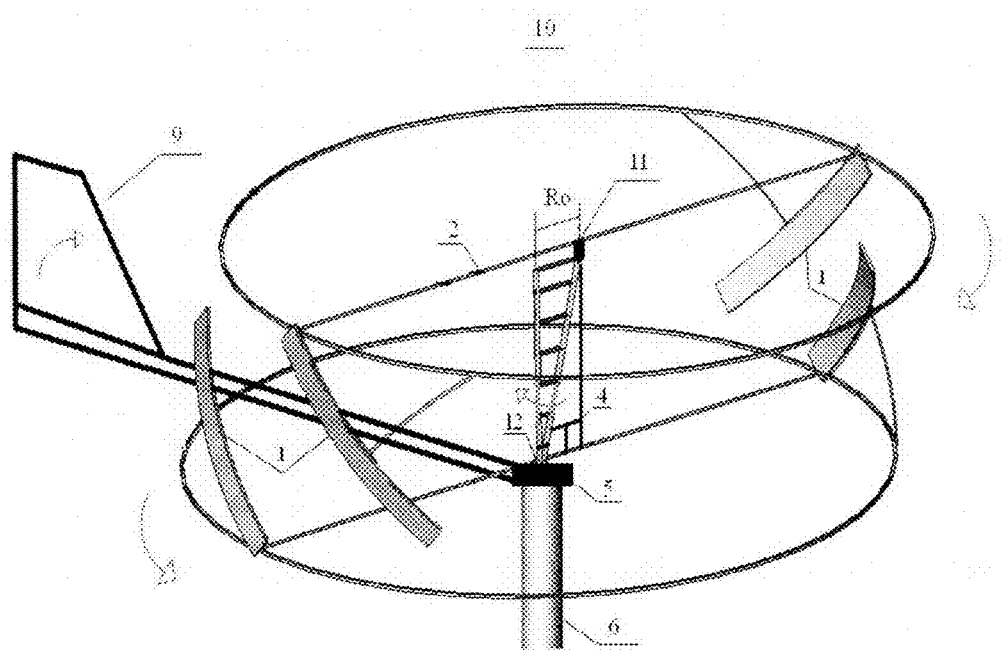
FIG. 8a is the axonometric view of a crossflow axes lift turbine with DISA having a passive yawing mechanism.

FIG. 8a shows a crossflow axes lift turbine with DISA 10, counter rotating Rotors 11 and 12 with a rotors offset Ro, two blades 1 per rotor attached to the rotors via arms 2, synchronizing mechanism 4, generator 5, support structure 6, and a passive yaw mechanism 9.

Figure 8B:
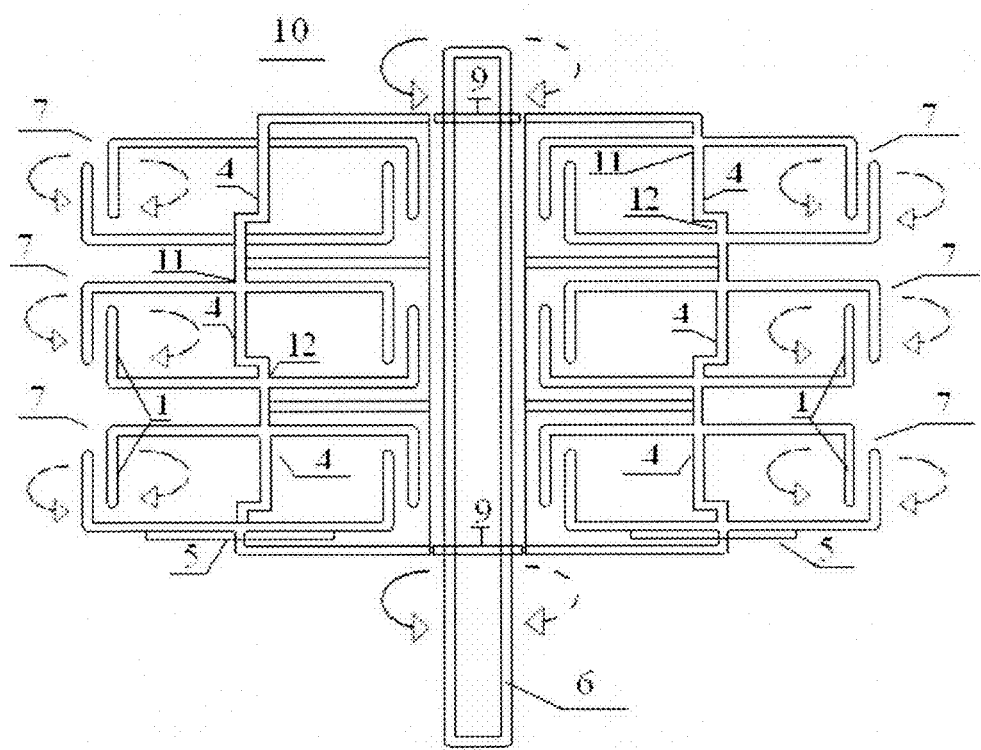
FIG. 8b is the front view of a crossflow axes lift turbine with DISA with an array of rotors, having an active yawing mechanism.

FIG. 8b shows a crossflow lift turbine with DISA 10 having an array of modules 7 (counter rotating rotors 11 and rotor 12 per module with a rotors offset Ro) mounted on each side of a support structure 6, synchronizing mechanism 4 per each module, and generator 5 (in this embodiment the array of modules rotate around the support structure by an active yaw system 9).

Figure 8C:
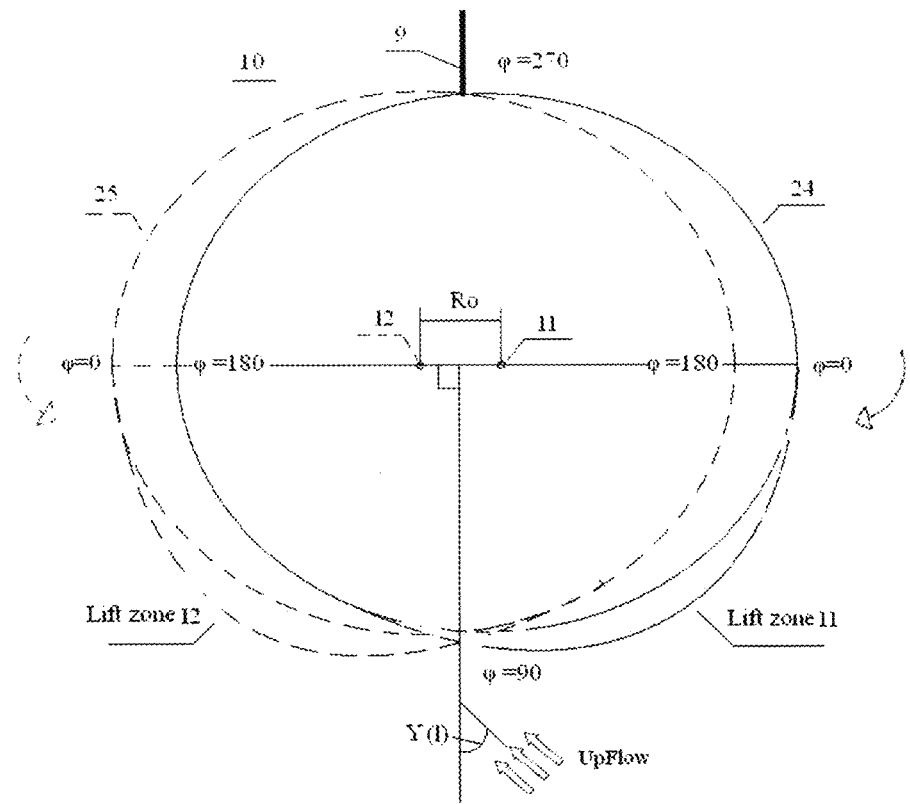
FIG. 8c is a schematic display of a crossflow axes lift turbine with DISA having a passive yawing mechanism.

FIG. 8c is a schematic display of a crossflow axes lift turbine with DISA 10, counter rotating Rotors 11 and 12 with a rotors offset Ro, the yaw angle Y(1) for the lift type devices, which is the angle between the fluid direction (the upper side) and the perpendicular of the device rotors co diameter (or the angle between the fluid direction and the yaw vane 9 direction).

Figure 8D:
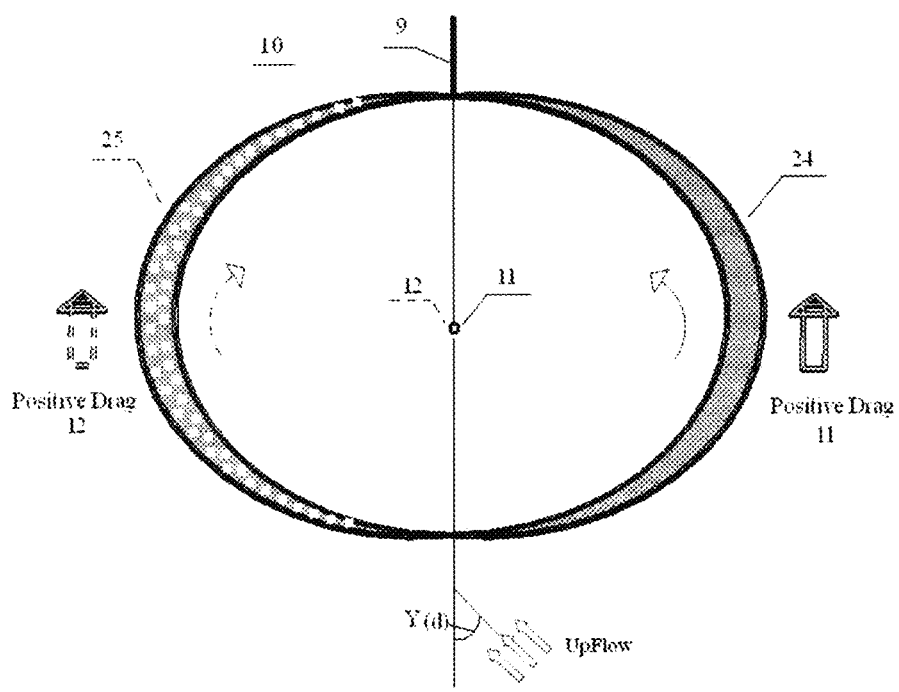
FIG. 8d is a schematic display of a crossflow axes drag turbine with DISA having a passive yawing mechanism.

FIG. 8d is a schematic display of a crossflow axes drag turbine with DISA 10, two counter rotating rotors 11 and 12, the yaw angle Y(d), which is the angle between the fluid direction (the upper side) and parallel of the device "energy extracting/exerting" part of swept area, where the "energy extracting/exerting" part swept area of these device is maximum (or the angle between the fluid direction and the yaw vane 9 direction).

Figure 9A:
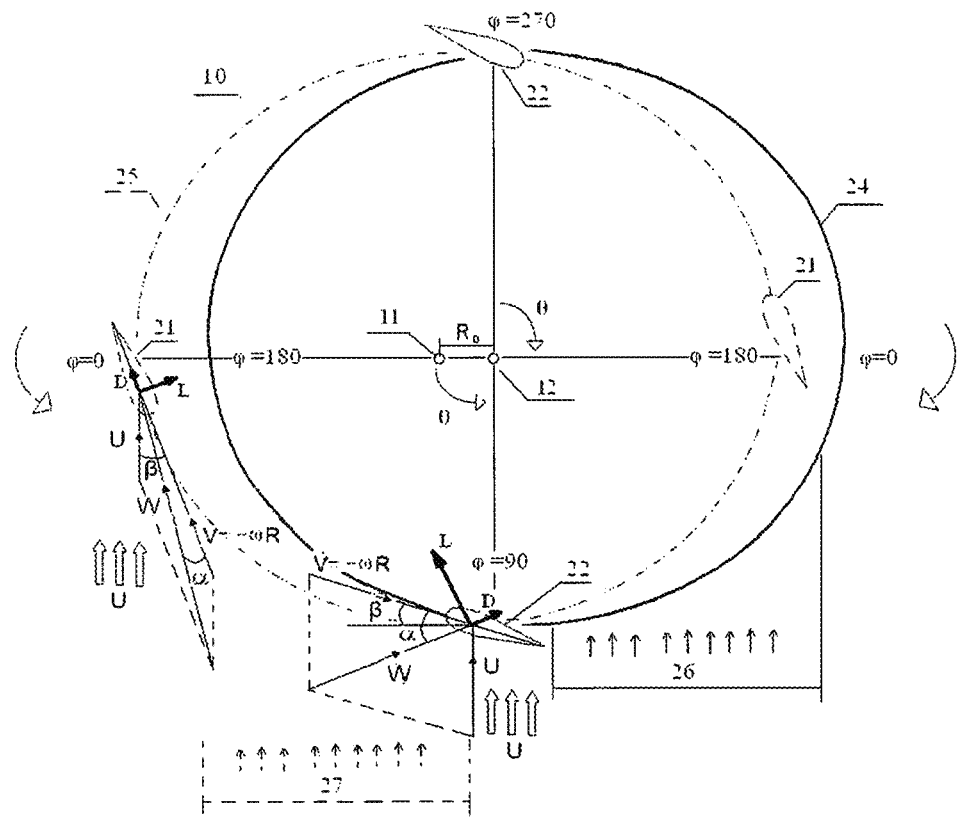
FIG. 9a and FIG. 9b are the schematic displays the crossflow axes lift turbines with DISA, having fixed blade pitch angle.

FIG. 9a shows a schematic display of a crossflow axes lift turbine with DISA 10, two counter rotating rotors 11 and 12 with a rotors offset Ro, blades 21 and 22 having blade pitch angle β fixed where pitch angle is a function of 0=f (Y, Ro, TSR, S, $R_N$, $B_L$, $V_T$, $B_T$, $F_T$, $B_N$, $B_{SR}$, $B_{SER}$). The fixed pitch angle β may be the same for all the blades or may be different for different blades for the same rotor or different rotors, and this depends on different parameters, especially the $B_{SR}$ and $B_{SBR}$ parameters. The fixed pitch angle β for the counter rotating rotors may be negative to create an earlier lift for each rotor blades, so each blade from opposite rotors have a lift swept area distanced from each other (the preset negative pitch angle may decrease the drag on the blades as well). The blade 22 of rotor 12 has a pitch angle β at φ=90, fluid speed U, V=−ώ*R, the relative fluid speed W, angle of attack α, lift force L, and drag force D, while the blade 21 of rotor 11 has the same pitch angle β, at φ=0 the fluid speed U, V=−ώ*R, the relative fluid speed W, angle of attack α, lift force L, and drag force D. The zone 26 of the rotor path 24 represents the Dynamic Fluid Shield from the blades of rotor 12 to the blades of rotor 11, while the zone 27 of the rotor path 21 represents the Dynamic Fluid Shield from the blades of rotor 11 to the blades of rotor 12.

Figure 9B:
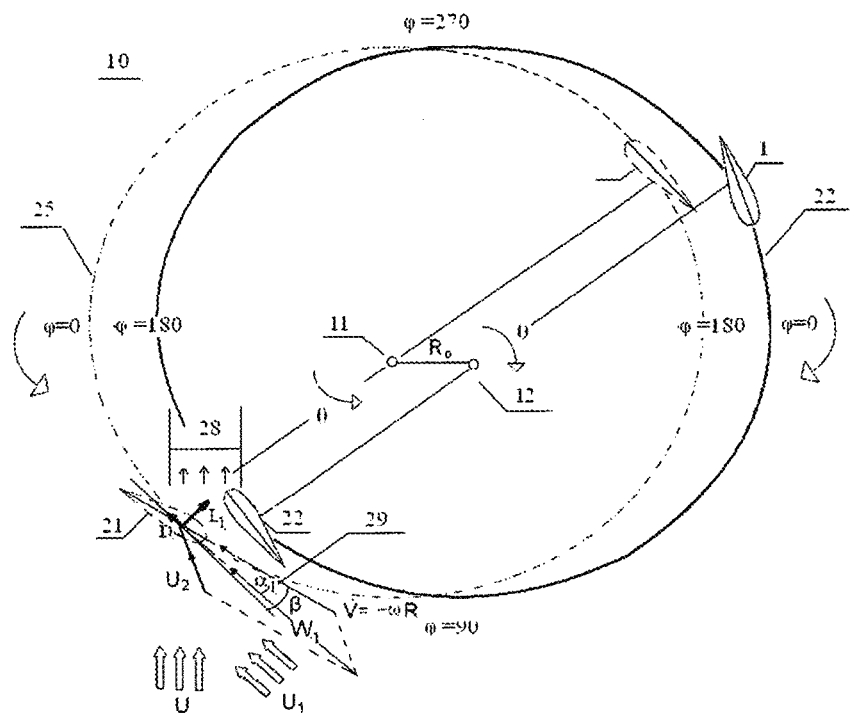

FIG. 9b shows a schematic display of crossflow axes lift turbine with DISA 10, two counter rotating rotors 11 and 12 with a rotors offset Ro, the blade 21 of rotor 11 with a pitch angle β at φ=45, fluid speed U, increased fluid speed $U_1$ deflected by the blade 22 of rotor 12 at φ=45, a resultant fluid speed $U_2$, V=−ώ*R, the relative fluid speed $W_1$ which comes as a result of $U_2$ and V, angle of attack $α_1$ which is different because of $U_2$ and $W_1$, lift force $L_1$, and drag force D. It shows the Dynamic Ducting 28 that entraps some of the fluid coming from opposite rotor blades, the Dynamic Change of Blade Angle of Attack 29 caused by Dynamic Flow Deflection maintaining a steady increase of angle of attack $α_1$ for an optimal lift, as well as delaying the deep stalling process and the wake creation process.

Figure 9C:
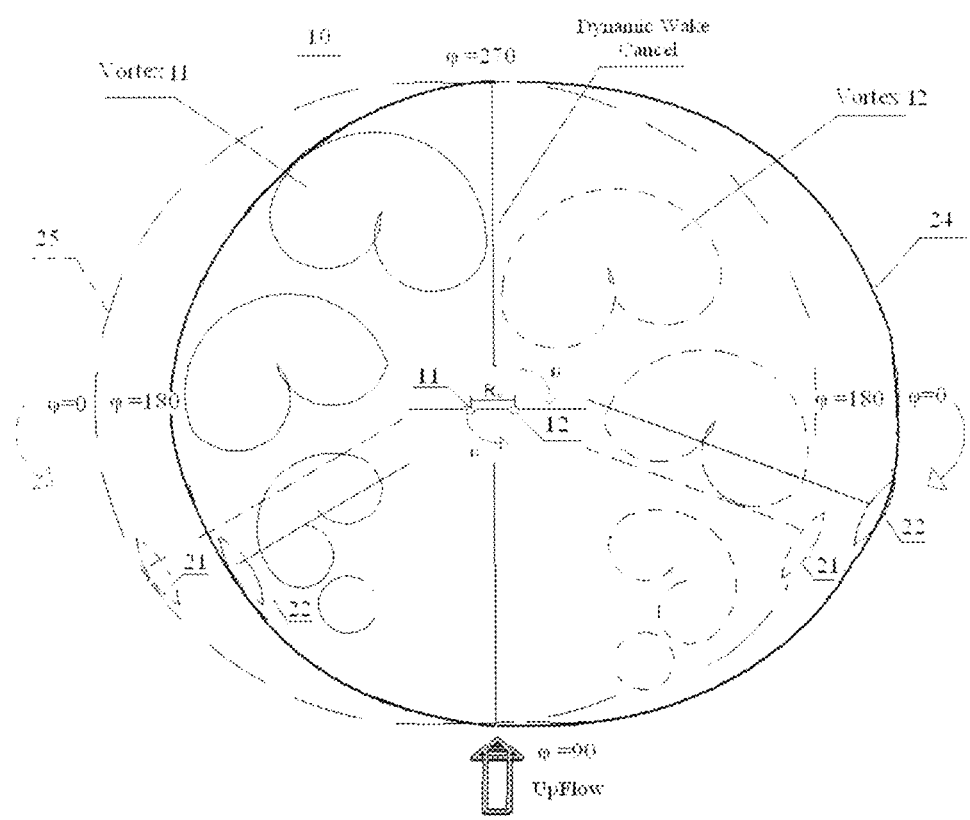
FIG. 9c is the schematic display of the Dynamic Wake Cancel effect.

FIG. 9c shows a schematic display of crossflow axes lift turbine with DISA 10, two counter rotating rotors 11 and 12 with a rotors offset Ro, the blade 21 of rotor 11, the blade 22 of rotor 12, Vortex 11 created by the blades 21 of rotor 11, Vortex 12 created by the blades 22 of rotor 12 at a different time compare to Vortex 11, and the Dynamic Wake Cancel process.

Figure 10:
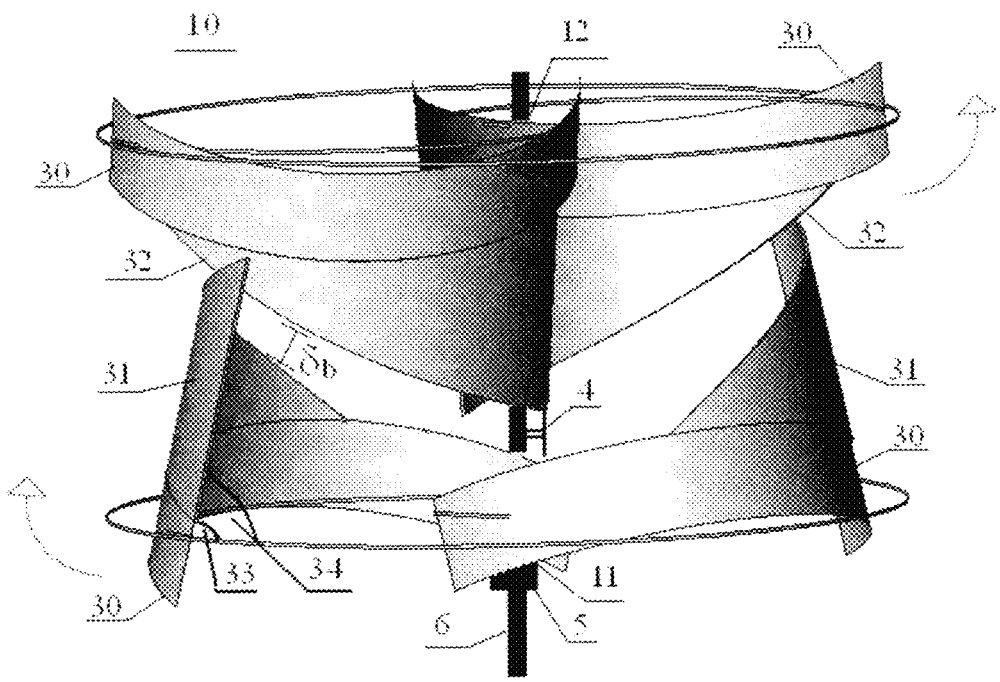
FIG. 10 is the axonometric view of a crossflow axes drag turbine with DISA type 1, having fixed drag blades type and coaxial rotors.

FIG. 10 shows a crossflow axes drag turbine with DISA 10 type 1, having coaxial rotors 11 and 12 counter rotating relative to each other, synchronizing mechanism 4, generator 5, support structure 6, two opposite symmetric fixed base blades 30 per rotor, two opposite symmetric fixed base blades extension 31 on the outer part of base blade 30, two opposite symmetric fixed base blades extension 32 on the inner part of base blade 30, base blade angle to the rotor plane 33, base blade extension angle to the rotor plane 34, the minimum space between two close passing blades from opposite rotors δB.

Figure 11:
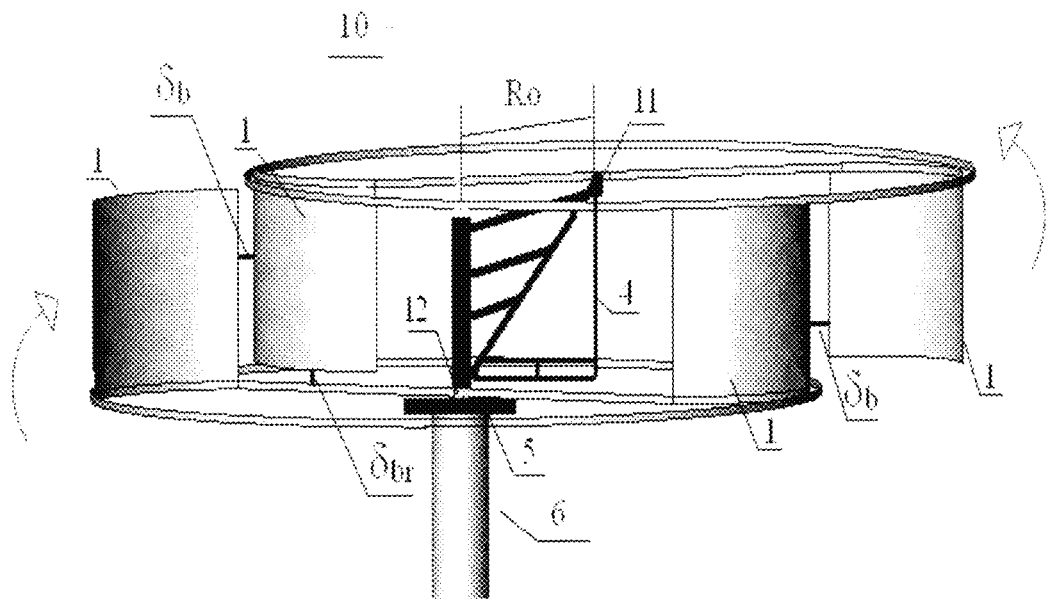
FIG. 11 is the axonometric of a crossflow axes drag turbine with DISA type 2, having fixed drag blades type and non coaxial rotors (including static ducting).

FIG. 11 shows a crossflow axes drag turbine with DISA 10 type 2, having non coaxial rotors 11 and 12 with a rotors offset Ro counter rotating relative to each other, two fixed blade 1 per rotor, the minimum space between two close passing blades from opposite rotors δB, synchronizing mechanism 4, generator 5, support structure 6.

Figure 12:
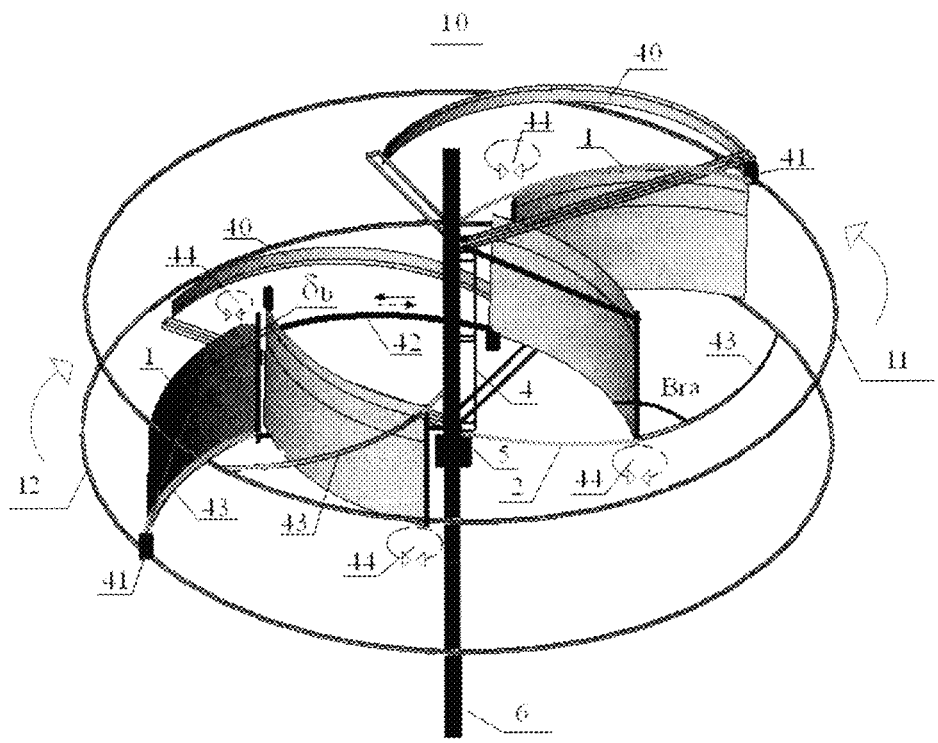
FIG. 12 is the axonometric view of a crossflow axes drag turbine with DISA type 3, having variable drag blades rotating around an axis which is perpendicular to the rotor plane (coaxial rotors).

FIG. 12 shows a crossflow axes drag turbine with DISA 10 type 3, having coaxial rotors 11 and 12 counter rotating relative to each other, synchronizing mechanism 4, generator 5, support structure 6, two symmetric blades 1 per rotor rotating relative to their rotor around an axis 44 which is perpendicular to the rotors plane on the arm 2 with a maximum $B_{RA}$ angle, at least one curved rail blade-rotor relative rotation mechanisms 40 per rotor fixed to the support structure parallel to the rotors plane, a wheel 41 at the outer lower edge of each blade with an axis of rotation perpendicular to the rotor-arm plane, one rotor step 43 on the rotor plane for each blade, and one curved blades synchronizing mechanism 42 for the blades of the same rotor.

Figure 13:
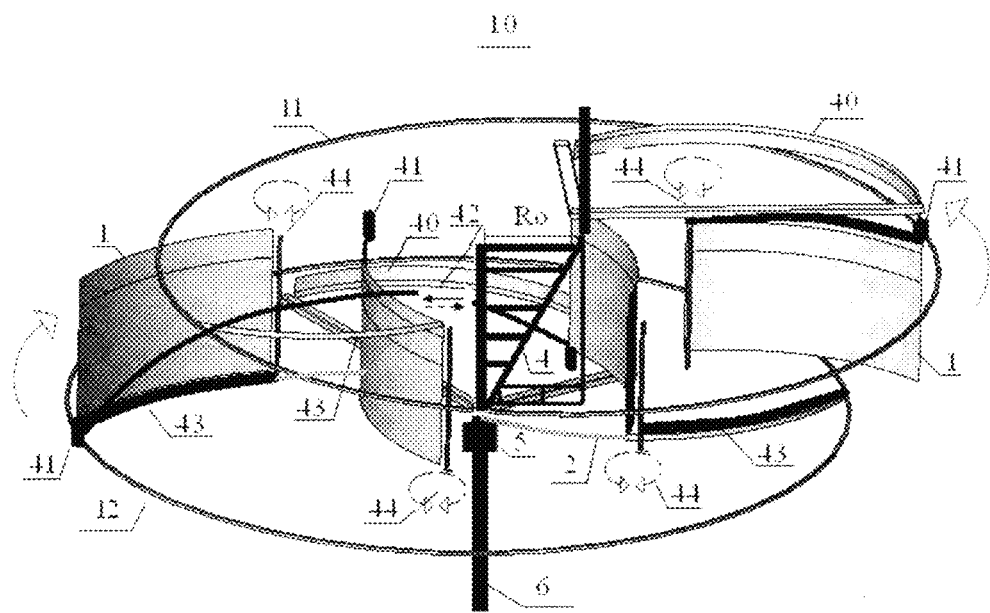
FIG. 13 is the axonometric view of a crossflow axes drag turbine with DISA type 4, having variable drag blades rotating around an axis which is perpendicular to the rotor plane (non coaxial rotors).

FIG. 13 shows a crossflow axes drag turbine with DISA 10 type 4, having non coaxial rotors 11 and 12 counter rotating relative to each other with a Rotors Offset Axes Ro, synchronizing mechanism 4, generator 5, support structure 6, two symmetric blades 1 per rotor rotating relative to their rotor around an axis 44 which is perpendicular to the rotors plane on the arm 2 with a maximum $B_{RA}$ angle, at least one curved rail blade-rotor relative rotation mechanisms 40 per rotor fixed to the support structure parallel to the rotors plane, a wheel 41 at the outer lower edge of each blade with an axis of rotation perpendicular to the rotor-arm plane, one rotor step 43 on the rotor plane for each blade, and one curved blades synchronizing mechanism 42 for the blades of the same rotor.

Figure 14:
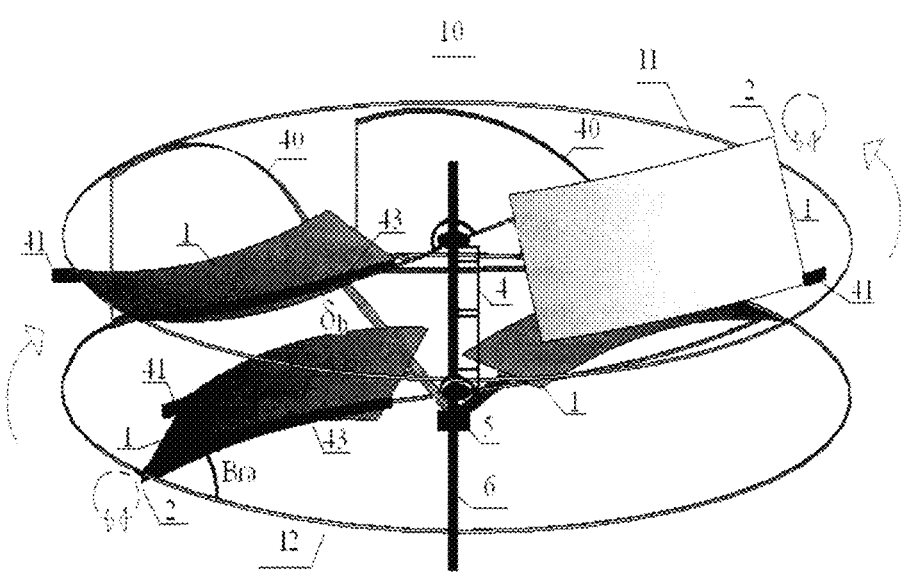
FIG. 14 is the axonometric view of a crossflow axes drag turbine with DISA type 5, having variable drag blades rotating around an axis which is parallel to the rotor plane (coaxial rotors).

FIG. 14 shows a crossflow axes drag turbine with DISA 10 type 5, having coaxial rotors 11 and 12 counter rotating relative to each other, synchronizing mechanism 4, generator 5, support structure 6, two symmetric blades 1 per rotor fixedly attached to a diameter arm 2 with an angle $B_{RA}$<=90° between them, where the arm 2 rotate relative to the rotor around its own axis with a maximum $B_{RA}$ angle, at least one curved rail blade-rotor relative rotation mechanisms 40 per rotor fixedly attached to the support structure on the side not between the rotors at the lower flow side, a wheel 41 at the outer edge of each blade opposite to its rotor with an axis of rotation parallel to the rotor-arm plane, one step on the rotor plane for each diameter arm to stop the arm with blade rotating relative to its rotor, wherein the $B_{RA}$ angle is maximum.

FIG. 4a, FIG. 6, FIG. 10, FIG. 11, FIG. 12, FIG. 13, FIG. 14 represent the CARM devices with DISA, where the electric machine is an electric generator. By replacing the electric generator with an electric motor, these embodiments create different devices such as crossflow axes propeller with DISA, crossflow axes fan-blower with DISA, crossflow axes pump-compressor with DISA, crossflow axes mixer with DISA inheriting any characteristic of the devices mentioned above. The CARM devices with DISA are characterized by a tradeoff between the advantages and disadvantages of the conventional CARM devices. The main advantage of the conventional CARM devices, which is the omni directional mentioned at the background of the invention section would becomes less advantageous for the CARM devices with DISA, because they are not fully omni directional anymore but semi omni directional. On the other hand the main disadvantages of the conventional CARM devices mentioned at the background of the invention section would become less disadvantageous for the new CARM devices with DISA, because of the new characteristics and effects the CARM devices with DISA have compare to the conventional CARM devices.

The invention claimed is:

1. A crossflow axes rotary mechanical device with dynamic increased swept area, the crossflow axes rotary mechanical device comprising:
   a support structure;
   at least two rotors attached to the support structure, axes of rotation of the at least two rotors being on a plane perpendicular to a fluid flow;
   at least one blade attached to each rotor of the at least two rotors via at least one rotor joint, each rotor of at least one pair of rotors of the at least two rotors facing opposite directions, the axes of rotation of the at least one pair of rotors of the at least two rotors being parallel, wherein swept areas formed by rotation of the at least one blade and the at least one rotor joint of each rotor of the at least one pair of rotors intersect; and at least one rotor synchronizing component attached to the at least two rotors, wherein the at least two rotors rotate relative to each other in synchrony and the at least one blade of each rotor do not collide during the rotation.

2. The crossflow axes rotary mechanical device of claim 1, wherein the at least one rotor synchronizing component is a mechanical device, the at least one rotor synchronizing component comprising:

at least one shaft connected to the at least one rotor, the at least one shaft being parallel to the axis of rotation of the at least one rotor; and gearing mechanism attached to the at least two rotors and the shaft.

3. The crossflow axes rotary mechanical device of claim 1, wherein the at least one rotor synchronizing component is an electrical device, each of the at least one rotor synchronizing component comprising:

an electric machine attached to the support structure, the electric machine being linked to an adjacent electric machine by a wired connection or a wireless connection; and an algorithm for synchronizing the at least two rotors.

4. The crossflow axes rotary mechanical device of claim 1, wherein a profile of the at least one blade of each rotor is a foil.

5. The crossflow axes rotary mechanical device of claim 1, wherein a profile of the at least one blade of each rotor is a curved vane.

6. A crossflow axes rotary mechanical device comprising:
a support structure;
at least two rotors, axes of rotation of the at least two rotors being on a plane perpendicular to a fluid flow, wherein the axes of rotation of the at least two rotors are parallel;
a first rotor of the at least two rotors rotatable about a first axis, the first rotor being attached to the support structure;
a second rotor of the at least two rotors rotatable about a second axis, the second rotor being attached to the support structure, wherein the first rotor and the second rotor face opposite directions;
at least one blade attached to the first rotor, rotation of the at least one blade forming a first swept area;
at least one blade attached to the second rotor, rotation of the at least one blade forming a second swept area, wherein the first swept area intersects the second swept area; and
a rotor synchronizing component attached to the first rotor and the second rotor, the rotation of the at least one blade of each rotor of the at least two rotors being in synchrony under control of the rotor synchronizing component.

7. The crossflow axes rotary mechanical device of claim 6,
wherein the at least one blade is attached to the first rotor via at least one rotor joint; and
wherein the at least one blade is attached to the second rotor via at least one rotor joint.

8. A crossflow axes rotary mechanical device comprising:
a support structure;
at least two rotors attached to the support structure, axes of rotation of the at least two rotors being on a plane perpendicular to a fluid flow;
at least one blade attached to each rotor of the at least two rotors via at least one rotor arm, each rotor of at least one pair of rotors of the at least two rotors facing different directions, each blade of each rotor of the at least one pair of rotors not crossing the at least one rotor arm of the other rotor, wherein swept areas formed by rotation of the at least one blade of each rotor of the at least one pair of rotors intersect;
at least one rotor synchronizing component attached to the at least one pair of rotors, wherein the at least one pair of rotors rotate relative to each other in synchrony and the at least one blade of each rotor of the at least one pair of rotors do not collide during the rotation; and
wherein the at least one blade of each rotor of the at least one pair of rotors passes through the swept area of the other rotor twice per revolution.

9. The crossflow axes rotary mechanical device of claim 8, wherein the at least one blade is attached to each rotor of the at least one pair of rotors of the at least two rotors via at least one rotor joint.

* * * * *